US012712294B2

(12) United States Patent
Pinnamaneni et al.

(10) Patent No.: US 12,712,294 B2
(45) Date of Patent: Aug. 18, 2026

(54) CABLE CONNECTING ASSEMBLY FOR MACHINE

(71) Applicant: Caterpillar Inc., Peoria, IL (US)

(72) Inventors: Sunil Pinnamaneni, Peoria, IL (US); Dean L. Kazubowski, Bradford, IL (US); Brad Beck, Peru, IL (US); George William Mould, Pace, FL (US)

(73) Assignee: Caterpillar Inc., Peoria, IL (US)

( * ) Notice: Subject to any disclaimer, the term of this patent is extended or adjusted under 35 U.S.C. 154(b) by 408 days.

(21) Appl. No.: 18/302,827

(22) Filed: Apr. 19, 2023

(65) Prior Publication Data

US 2024/0356246 A1 Oct. 24, 2024

(51) Int. Cl.
*H01R 4/46* (2006.01)
*H01R 11/12* (2006.01)

(52) U.S. Cl.
CPC ............... *H01R 4/46* (2013.01); *H01R 11/12* (2013.01); *H01R 2201/26* (2013.01)

(58) Field of Classification Search
CPC .......... H01R 4/46; H01R 4/305; H01R 11/12; H01R 4/34; H01R 4/38; H01R 4/30
USPC .......................................................... 439/775
See application file for complete search history.

(56) References Cited

U.S. PATENT DOCUMENTS 2,582,384 A * 1/1952 Knollman ................ H01R 4/30 248/65
3,238,496 A 3/1966 Crowther
3,334,327 A * 8/1967 Anspach .............. H01R 13/426 439/744
7,537,494 B1 5/2009 Umlauf
8,602,829 B2 12/2013 Kosyanchuk et al.
9,520,656 B2 12/2016 Kakimi et al.
10,476,180 B2 11/2019 Eckel et al.
2009/0068873 A1* 3/2009 Kulig ........................ H01R 4/38 439/321
2011/0097948 A1* 4/2011 Melni ...................... H01R 4/56 439/733.1

(Continued)

FOREIGN PATENT DOCUMENTS

CN 208750162 U 4/2019
CN 214479319 U 10/2021

(Continued)

*Primary Examiner* — Christopher M Koehler
*Assistant Examiner* — Gregory L Mangot

(57) ABSTRACT

A cable connecting assembly for a machine includes a cable, and a contact terminal configured to connect with the cable. The contact terminal includes a first body portion defining a first diameter and a second body portion defining a second diameter. The second diameter is greater than the first diameter of the first body portion. The cable connecting assembly further includes a connecting device configured to connect with the contact terminal. The connecting device includes a connecting plate includes a first portion, a second portion connected to the first portion, and a bracket configured to removably connect with the second portion of the connecting plate, such that the bracket and the second portion are together configured to removably connect the contact terminal with the connecting device. The connecting device further includes at least one coupling device configured to removably connect the bracket with the second portion of the connecting plate.

10 Claims, 13 Drawing Sheets

(56) References Cited

U.S. PATENT DOCUMENTS

| | | | | |
|---|---|---|---|---|
| 2012/0178314 | A1* | 7/2012 | Yu | H01R 13/595 439/810 |
| 2018/0248280 | A1* | 8/2018 | Takahashi | H01M 50/503 |

FOREIGN PATENT DOCUMENTS

| | | | |
|---|---|---|---|
| CN | 114069263 | A | 2/2022 |
| WO | 2022122672 | A1 | 6/2022 |

* cited by examiner

CABLE CONNECTING ASSEMBLY FOR MACHINE

TECHNICAL FIELD

The present disclosure relates to a cable connecting assembly for a machine, a contact terminal of the cable connecting assembly, and a connecting device of the cable connecting assembly.

BACKGROUND

Machines, such as off-highway trucks, wheel dozers, etc. include electric power systems or hybrid (for e.g., diesel-electric) power systems that are used to provide power for propulsion, implement movement, and other operations. Generally, such power systems include high-voltage cables for electrically connecting an electric motor (or a generator) with an inverter of the machine. A busbar is fixedly connected to a housing of the inverter. The high-voltage cables may be connected to the busbar to establish an electric connection via the high-voltage cables. Further, in order to connect the high-voltage cable with the busbar, a lug connector is crimped to the high-voltage cable. Moreover, an electrically conductive receptacle is connected between a corresponding high-voltage cable and the lug connector In order to connect the lug connector with the busbar, openings in the lug connector and openings in the busbar align with each other for receiving one or more fastener that removably couple the lug connector with the busbar. During an assembly of the high-voltage cable, the openings in the lug connector need to be in alignment with the openings in the busbar. However, the orientation of the lug connector may be cumbersome to control, and the lug connector may have a different orientation relative to the busbar. In order to ensure accurate orientation of the lug connector, the lug connector and/or the high-voltage cable may require twisting. Typically, the high-voltage cables are stiff and large in diameter, which may make the high-voltage cables difficult to twist. Moreover, specialized tooling and/or set-ups may be required to twist the high-voltage cables in order to align the lug connector with the busbar. In some cases, attempts to twist the lug connector may damage the lug connector or the high-voltage cable, which may not be desirable.

Further, the current process of the assembly the high-voltage cables may be time consuming and may warrant considerable human effort. Moreover, assembly time may be dependent on the expertise of an assembly personnel, and novice assembly personnel may require more time to assemble as compared to experienced assembly personnel. Overall, the current design of the lug connector and the busbar as well as the process of assembling the lug connector and the busbar may be time consuming, may increase required human effort, and may be costly.

U.S. Pat. No. 8,602,829 describes a lug having an integrated shoe for fastening the lug to a conductor and a terminal of a circuit breaker. The lug includes a housing and a cavity in the housing configured to receive the electrical conductor. The shoe has a hinge connecting the shoe to an inner wall of the housing. A slot is located adjacent to the shoe such that the shoe is positioned between the cavity and the slot, which receives the terminal. A hole in the housing receives a fastener that extends into the cavity. A force applied to the fastener urges the conductor to clamp against the shoe to cause it to deflect about the hinge and to press against the terminal to hold the lug in a secure relationship relative to the terminal and to hold the conductor in a secure relationship relative to the lug.

SUMMARY OF THE DISCLOSURE

In an aspect of the present disclosure, a cable connecting assembly for a machine is provided. The cable connecting assembly includes a cable. The cable connecting assembly also includes a contact terminal configured to connect with the cable. The contact terminal includes a first body portion defining a first diameter, a first end, and a second end opposite the first end. The first body portion extends along a first distance between the first end and the second end. The contact terminal also includes a second body portion extending from the first body portion and defining a second diameter, wherein the second diameter is greater than the first diameter of the first body portion. The cable connecting assembly further includes a connecting device configured to connect with the contact terminal. The connecting device extends along a longitudinal axis. The connecting device includes a connecting plate. The connecting plate includes a first portion. The connecting plate also includes a second portion connected to the first portion. The second portion defines a first side and a second side, such that the second portion is connected to the first portion at the first side. The connecting device also includes a bracket configured to removably connect with the second portion of the connecting plate, such that the bracket and the second portion are together configured to removably connect the contact terminal with the connecting device. The connecting device further includes at least one coupling device configured to removably connect the bracket with the second portion of the connecting plate.

In another aspect of the present disclosure, a contact terminal for a cable is provided. The contact terminal includes a first body portion defining a first diameter, a first end, and a second end opposite the first end. The first body portion extends along a first distance between the first end and the second end. The contact terminal also includes a second body portion extending from the first body portion and defining a second diameter. The second diameter is greater than the first diameter of the first body portion.

In yet another aspect of the present disclosure, a connecting device for a machine is provided. The connecting device is configured to connect with a cable. The connecting device extends along a longitudinal axis. The connecting device includes a connecting plate. The connecting plate includes a first portion. The connecting plate also includes a second portion connected to the first portion. The second portion defines a first side and a second side, such that the second portion is connected to the first portion at the first side. The connecting device also includes a bracket configured to removably connect with the second portion of the connecting plate, such that the bracket and the second portion are together configured to removably connect the cable with the connecting device. The connecting device further includes at least one coupling device configured to removably connect the bracket with the second portion of the connecting plate.

Other features and aspects of this disclosure will be apparent from the following description and the accompanying drawings.

DETAILED DESCRIPTION

Figure 1:
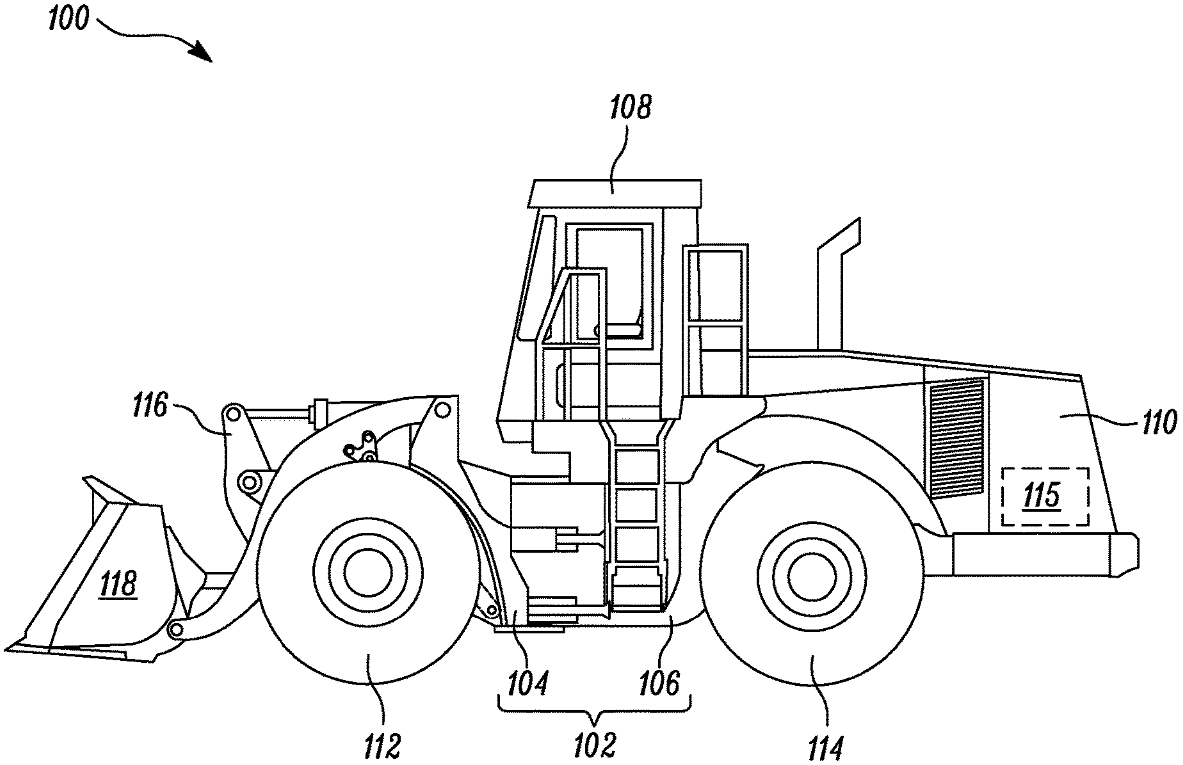
FIG. 1 is a schematic side view of a machine, according to an embodiment of the present disclosure.

Wherever possible, the same reference numbers will be used throughout the drawings to refer to the same or like parts. Referring to FIG. 1, a schematic side view of an exemplary machine 100 is illustrated. The machine 100 is embodied as a wheel loader that may be used for purposes, such as, construction, landscaping, agriculture, and the like. Alternatively, the machine 100 may be embodied as an off-highway truck, a dozer, an excavator, a tractor, a motor grader, a scraper, etc. that may be used in various industries to move, remove, or load materials, such as, asphalt, debris, dirt, snow, feed, gravel, logs, raw minerals, recycled material, rock, sand, woodchips, etc.

The machine 100 includes a frame 102. The frame 102 supports various components of the machine 100. The frame 102 includes a front frame 104 and a rear frame 106. The machine 100 also includes an operator cabin 108 supported by the rear frame 106. The operator cabin 108 may include one or more controls (not shown), such as, joysticks, pedals, levers, buttons, switches, knobs, audio visual devices, operator consoles, a steering wheel, and the like. The controls may enable an operator to control the machine 100 during operation. The machine 100 includes a hood 110 mounted on the rear frame 106. Further, the machine 100 includes a drive system 115 supported by the frame 102. In an example, the drive system 115 may include an electric drive system. In the illustrated example, the drive system 115 includes a hybrid drive system. For example, the drive system 115 may include a combination of diesel and electric components.

The frame 102 supports a pair of front wheels 112 and a pair of rear wheels 114. The front wheels 112 and the rear wheels 114 provide support and mobility to the machine 100 on grounds. Alternatively, the machine 100 may include tracks instead of the front and rear wheels 112, 114.

The machine 100 also includes a linkage assembly 116. The linkage assembly 116 is movably coupled to the frame 102. The machine 100 further includes a work tool 118 movably coupled to the frame 102 via the linkage assembly 116. The work tool 118 is embodied as a bucket that may be used for loading/unloading purposes. In some examples, the work tool 118 may be any other type of work tool known in the art that may be used in any work machine or vehicle. The work tool 118 may be used to perform one or more work operations, such as, loading, stock piling, dumping, and the like.

Figure 2:
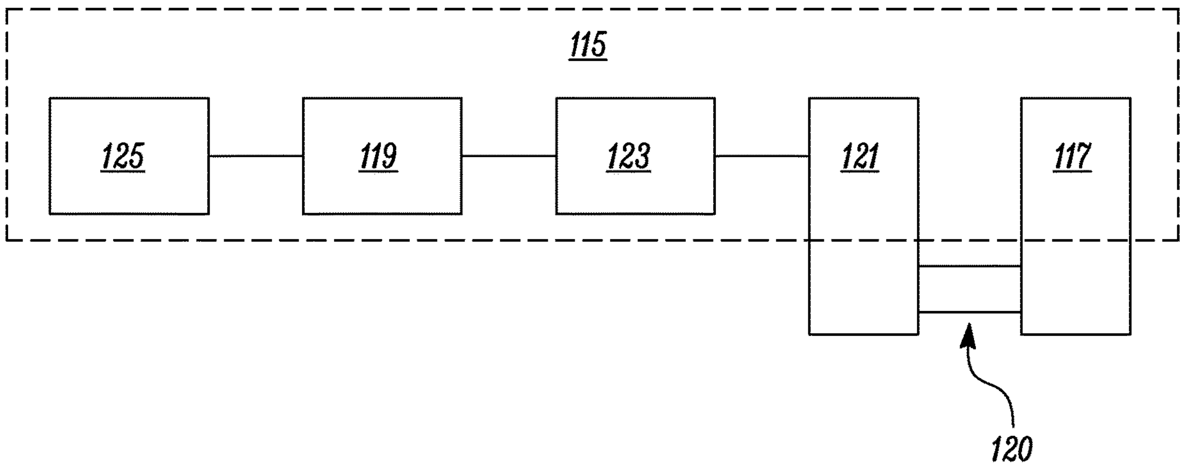
FIG. 2 is a block diagram of a drive system associated with the machine of FIG. 1, according to an embodiment of the present disclosure.

FIG. 2 illustrates a block diagram of the drive system 115 associated with the machine 100 of FIG. 1. The drive system 115 may include a motor 117, a generator 119, an engine 125, a rectifier 123, an inverter 121, and, optionally, batteries (not shown). The drive system 115 may provide power to various components of the machine 100 for operational and mobility requirements. In an example, the motor 117 may be embodied as a traction motor that may be used to move the front and rear wheels 112, 114 (see FIG. 1). The engine 125 may be an internal combustion engine. The engine 125 may produce an output torque to rotate a rotor (not shown) of the generator 119 to produce electrical power, for example, in the form of alternating current (AC) power. The electrical power may be supplied to the rectifier 123 and converted to direct current (DC) power. The rectified DC power may be converted again to AC power by the inverter 121. The inverter 121 is connected to the motor 117 through a cable connecting assembly 120. The inverter 121 may allow the motor 117 to operate at variable speeds.

Figure 3:
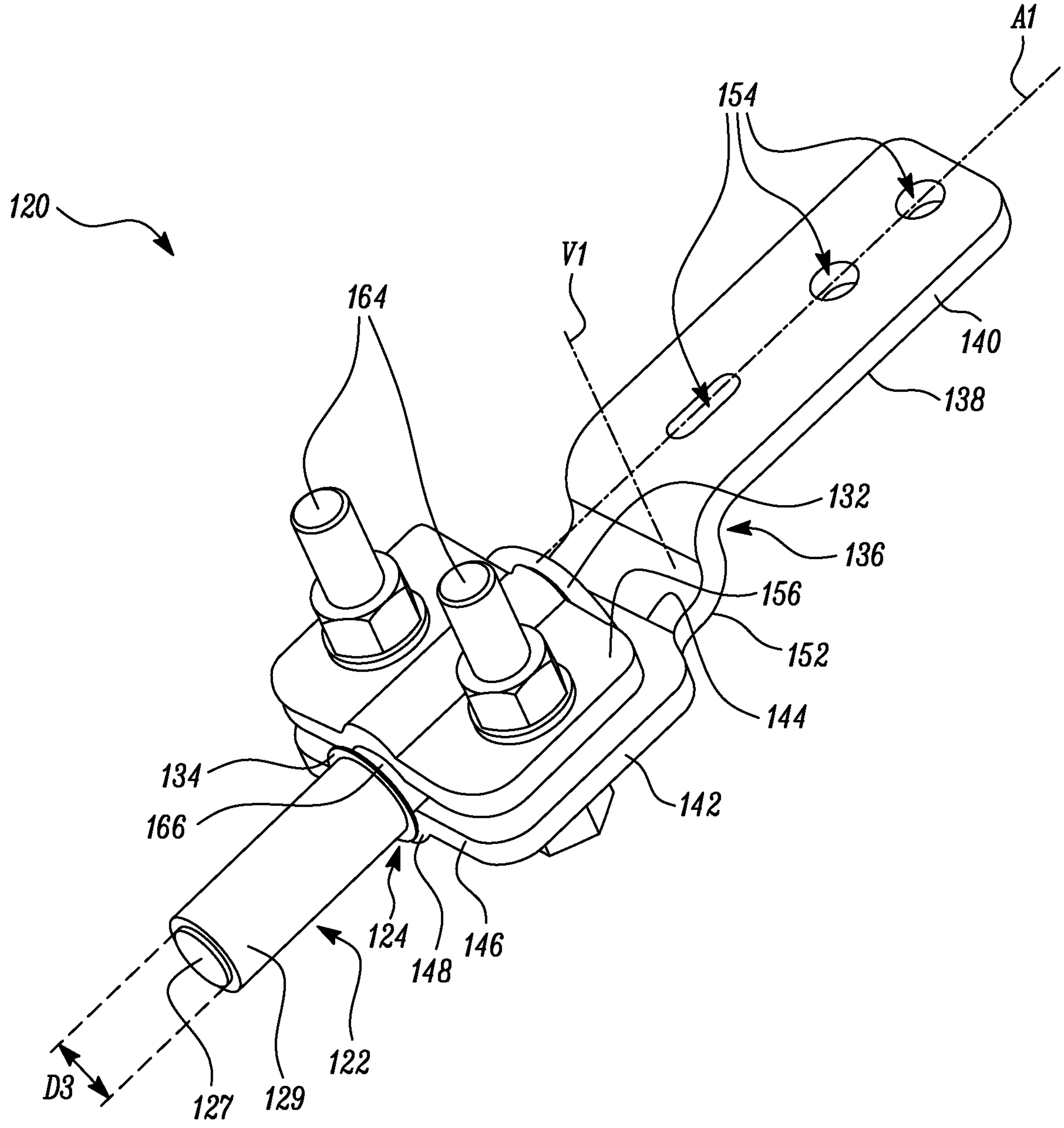
FIG. 3 is a schematic perspective view of a cable connecting assembly for the machine of FIG. 1, according to an embodiment of the present disclosure.

FIG. 3 illustrates a schematic perspective view of the cable connecting assembly 120 for the machine 100 of FIG. 1, according to an embodiment of the present disclosure. The cable connecting assembly 120 includes a cable 122. The cable 122 may be a high-voltage cable for transmitting electrical power between the motor 117 (see FIG. 2) and the inverter 121 (see FIG. 2). Further, the cable 122 includes a conductive core 127 made of copper, and an insulation layer 129. The conductive core 127 defines a diameter D3. The insulation layer 129 surrounds the conductive core 127. The cable connecting assembly 120 also includes a contact terminal 124. The contact terminal 124 connects with the cable 122.

Figure 4:
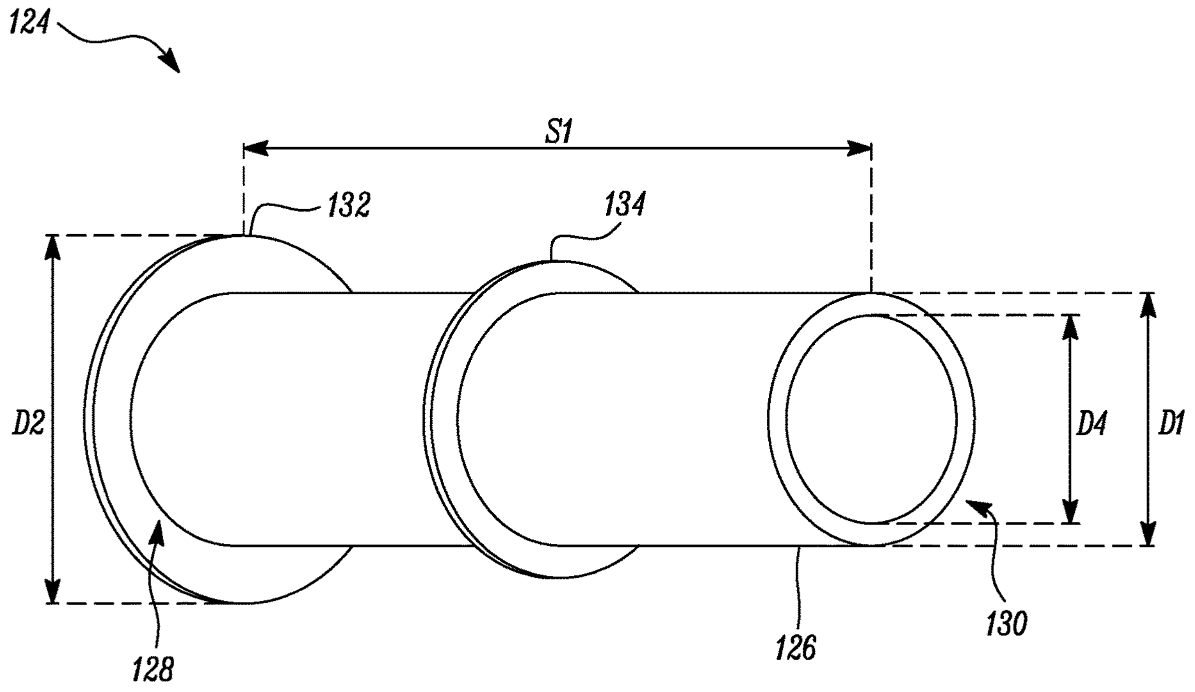
FIG. 4 is a schematic perspective view of a contact terminal associated with the cable connecting assembly of FIG. 3, according to an embodiment of the present disclosure.

FIG. 4 illustrates a schematic perspective view of the contact terminal 124 associated with the cable connecting assembly 120 of FIG. 3, according to an embodiment of the present disclosure. The contact terminal 124 includes a first body portion 126. In the illustrated embodiment of FIG. 4, the first body portion 126 is cylindrical in shape. In some other embodiments, the first body portion 126 may have a rectangular shape, a triangular shape, or any other shape based on application attributes. The first body portion 126 defines a first diameter D1, a first end 128, and a second end 130 opposite the first end 128. The first diameter D1 is the outer diameter of the first body portion 126. The first body portion 126 further defines an inner diameter D4. The inner diameter D4 may be slightly larger than the diameter D3 (see FIG. 3) of the conductive core 127 (see FIG. 3). Further, the first body portion 126 is crimped to secure the conductive core 127 thereto. The first body portion 126 extends along a first distance S1 between the first end 128 and the second end 130.

The contact terminal 124 also includes a second body portion 132 extending from the first body portion 126. The second body portion 132 defines a second diameter D2. The second diameter D1 is greater than the first diameter D1 of the first body portion 126. In the illustrated embodiment of FIG. 4, the second body portion 132 extends from the first end 128 of the first body portion 126. The second body portion 132 includes an annular projection that extends from the first body portion 126.

The contact terminal 124 further includes an annular projection 134 extending from the first body portion 126. The annular projection 134 is axially spaced apart from the second body portion 132. Further, the annular projection 134 is disposed between the first and second ends 128, 130 of the first body portion 126. Both the second body portion 132 and the annular projection 134 are optional and can be omitted from example embodiments.

Referring again to FIG. 3, the cable connecting assembly 120 further includes a connecting device 136. The connecting device 136 connects with the cable 122. In the illustrated embodiment of FIG. 3, the connecting device 136 connects with the cable 122 via the contact terminal 124. Specifically, the contact terminal 124 connects the connecting device 136 with the cable 122 to establish electric communication between the connecting device 136 and the cable 122. In other embodiments, the cable connecting assembly 120 may omit the contact terminal 124, and the connecting device 136 may directly receive the cable 122 therein for establishing the electric connection.

Sections of connecting device 136 extend along a longitudinal axis A1. The connecting device 136 also includes a section that further extends along a vertical axis V1 that is orthogonal to the longitudinal axis A1.

Figure 5:
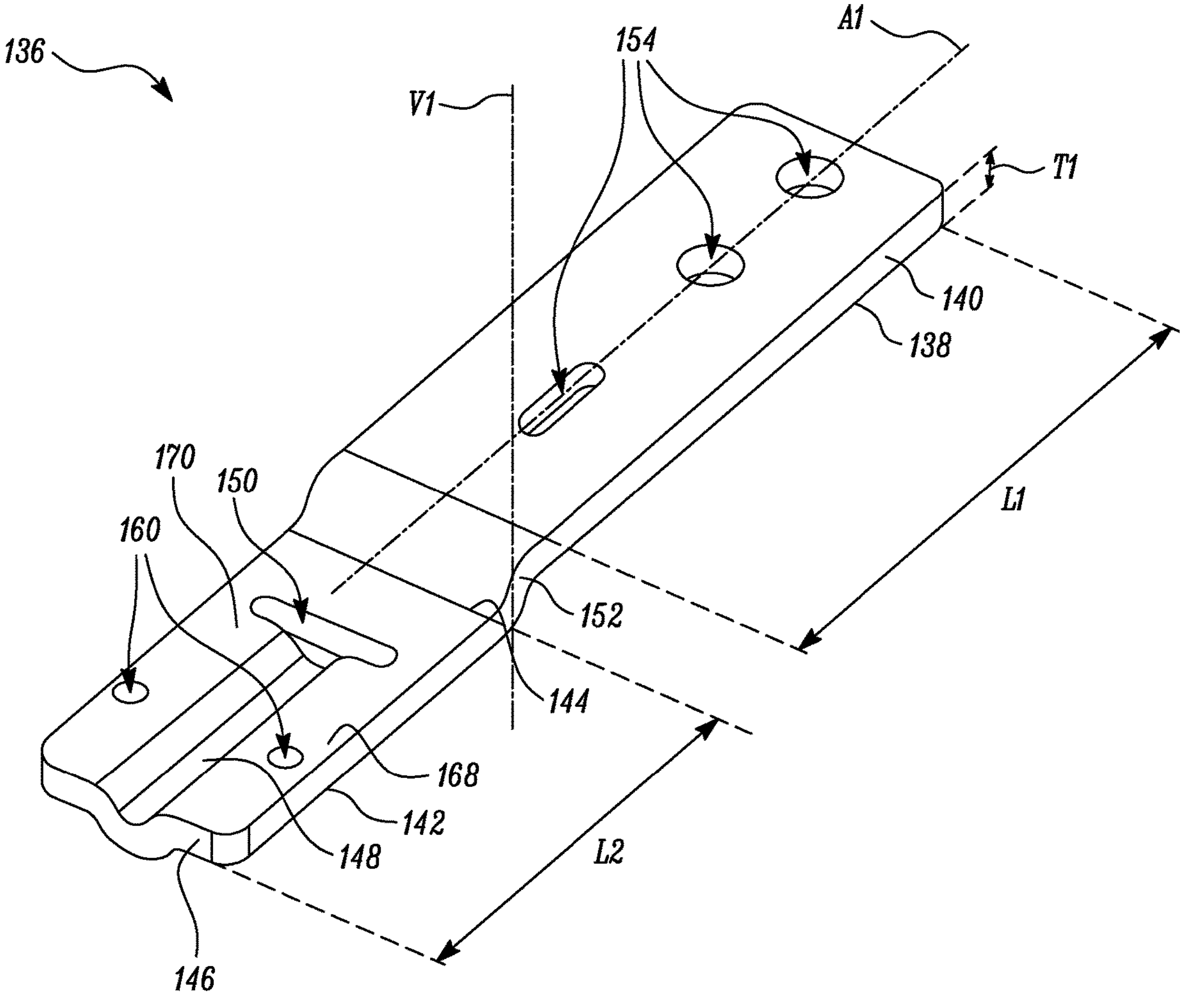
FIG. 5 is a schematic perspective view of a connecting device associated with the cable connecting assembly of FIG. 3, according to an embodiment of the present disclosure.

FIG. 5 illustrates a schematic perspective view of the connecting device 136 associated with the cable connecting assembly 120 of FIG. 3, according to an embodiment of the present disclosure. The connecting device 136 includes a connecting plate 138.

The connecting plate 138 includes a first portion 140. In some examples, the first portion 140 may have a rectangular shape. The first portion 140 may define one or more holes 154 extending orthogonally to the longitudinal axis A1. In some examples, the one or more holes 154 may allow an electronic circuit (not shown), such as, a printed circuit board (PCB) or a printed circuit assembly (PCA) to couple to the first portion 140 of the connecting plate 138 via a fastening means (not shown). The one or more holes 154 may have a circular shape, a rectangular shape, a square shape, a slotted shape, and the like. In the illustrated embodiment of FIG. 5, the first portion 140 of the connecting plate 138 includes three holes 154 that may allow the PCB or the PCA to couple to the connecting plate 138. Further, the first portion 140 may be welded to a housing of the inverter 121 (see FIG. 2) to allow electrical power transmission between the inverter 121 and the motor 117 (see FIG. 2).

The connecting plate 138 also includes a second portion 142 connected to the first portion 140. In some examples, the first portion 140 of the connecting plate 138 may be offset from the second portion 142 of the connecting plate 138 along the vertical axis V1 that is orthogonal to the longitudinal axis A1. More particularly, the first portion 140 may be spaced apart from the second portion 142 along the vertical axis V1. In some examples, the first portion 140 of the connecting plate 138 defines a first length L1 along the longitudinal axis A1. Further, the second portion 142 of the connecting plate 138 defines a second length L2. The first length L1 is greater than the second length L2. In some examples, the first portion 140 can lie in a first plane, the second portion 142 can lie in a second plane, and the first and second planes can be parallel to one another.

The connecting plate 138 further includes an intermediate portion 152. The intermediate portion 152 connects the first portion 140 to the second portion 142. In the illustrated embodiment of FIG. 5, the intermediate portion 152 is embodied as a curved piece that connects the first portion 140 to the second portion 142. In some other embodiments, the intermediate portion 152 may have any other profile or shape, based on application attributes. In some embodiments, the first portion 140, the second portion 142, and the intermediate portion 152 can be integral parts of a single component.

The second portion 142 defines a first side 144 and a second side 146, such that the second portion 142 is connected to the first portion 140 at the first side 144. The second portion 142 includes an elongate, first curved section 148. The second portion 142 defines a first slot 150 extending orthogonally to the first curved section 148. Particularly, the first slot 150 extends along the vertical axis V1 that is orthogonal to the longitudinal axis A1. Further, the second portion 142 defines a first planar surface 168 and a second planar surface 170, such that the first curved section 148 is disposed between the first planar surface 168 and the second planar surface 170.

The connecting plate 138 also defines one or more first openings 160 disposed on the second portion 142 along the longitudinal axis A1. Particularly, the first openings 160 are disposed on either side of the first curved section 148 of the connecting plate 138. In other words, the first openings 160 are disposed on the first planar surface 168 and the second planar surface 170 of the second portion 142. In the illustrated embodiment of FIG. 5, the second portion 142 defines two first openings 160. More particularly, one of the first openings 160 extends from the first planar surface 168 of the second portion 142, and the other first opening 160 extends from the second planar surface 170 of the second portion 142. In some other embodiments, the second portion 142 may define a single first opening, four first openings (two on either side of the first curved section 148), and the like.

It should be noted that the connecting device 136 has a uniform thickness T1 along the vertical axis V1. More particularly, the first portion 140, the second portion 142, and the intermediate portion 152 of the connecting device 136 have the same thickness T1. In other examples, the first portion 140, the second portion 142, and the intermediate portion 152 of the connecting device 136 may have different thicknesses.

Referring now to FIGS. 3 and 5, the connecting device 136 further includes a bracket 156. The bracket 156 removably connects with the second portion 142 of the connecting plate 138. The bracket 156 and the second portion 142 together removably connect the cable 122 with the connecting device 136. Specifically, the bracket 156 and the second portion 142 together removably connect the contact terminal 124 with the connecting device 136.

Figure 6:
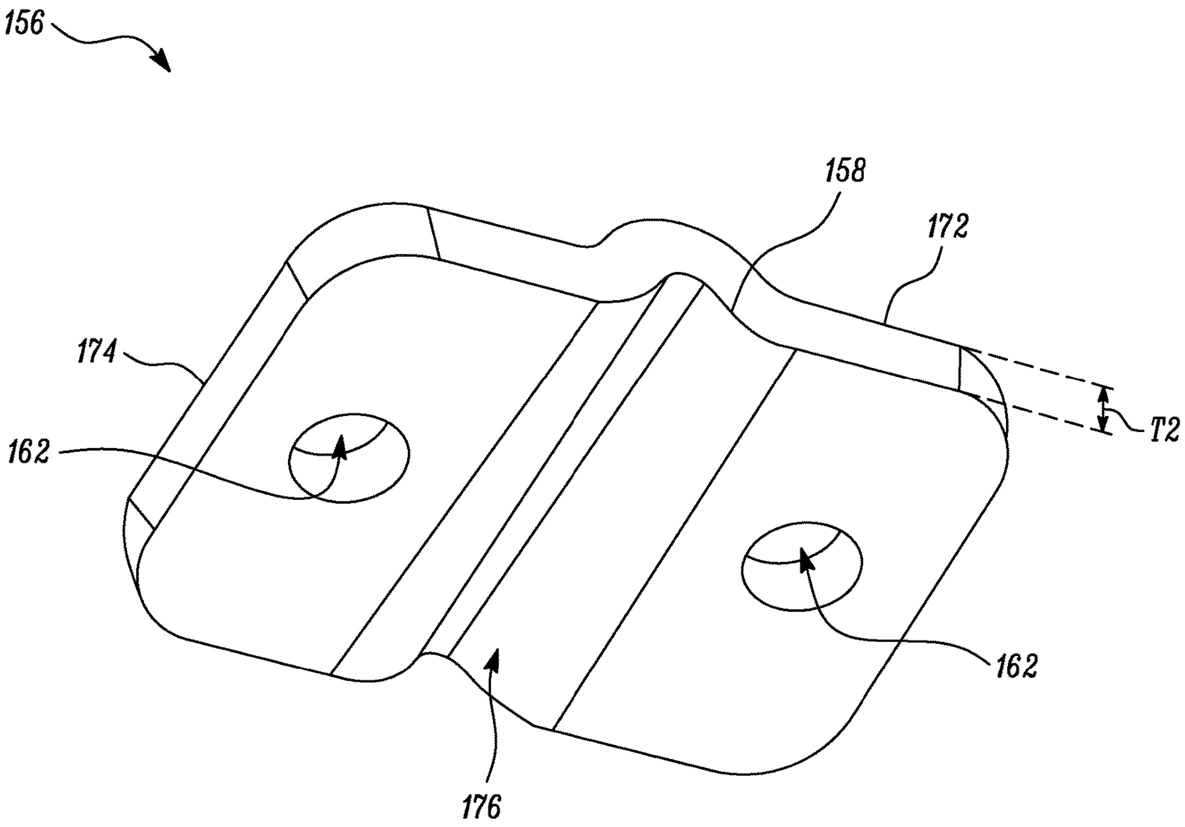
FIG. 6 is a schematic perspective view of a bracket associated with the connecting device of FIG. 5, according to an embodiment of the present disclosure.

FIG. 6 illustrates a schematic perspective view of the bracket 156 associated with the connecting device 136 of FIG. 5, according to an embodiment of the present disclosure. The bracket 156 includes an elongate, second curved section 158. Further, the bracket 156 defines a third planar surface 172 and a fourth planar surface 174, such that the second curved section 158 is disposed between the third planar surface 172 and the fourth planar surface 174. The bracket 156 defines a uniform thickness T2. In some examples, the thickness T2 of the bracket 156 may be similar to the thickness T1 (see FIG. 5) of the connecting device 136 (see FIG. 5). In other examples, the thickness T2 of the bracket 156 may be different from the thickness T1 of the connecting device 136.

The bracket 156 defines one or more second openings 162. Particularly, the second openings 162 are disposed on either side of the second curved section 158 of the connecting plate 138. In the illustrated embodiment of FIG. 6, the bracket 156 defines two second openings 162. More particularly, one second openings 162 extends from the third planar surface 172 of the bracket 156, and the other second opening 162 extends from the fourth planar surface 174 of the bracket 156. In some other embodiments, the bracket 156 may define a single second opening, four second openings (two on either side of the second curved section 158), and the like.

Referring now to FIG. 3, the cable connecting assembly 120 includes one or more coupling devices 164. The coupling device 164 removably connects the bracket 156 with the second portion 142 of the connecting plate 138. In some embodiments, the coupling device 164 includes a mechanical fastener. In some examples, the coupling device 164 may include a screw, a bolt, a rivet, and the like for coupling the bracket 156 to the connecting plate 138. In the illustrated example of FIG. 3, the cable connecting assembly 120 includes two coupling devices 164 herein. Alternatively, the cable connecting assembly 120 may include four coupling devices 164. Each of the first openings 160 (see FIG. 5) in the second portion 142 align with a corresponding second opening 162 (see FIG. 5) in the bracket 156 in order to receive a corresponding coupling device 164 to removably connect the bracket 156 with the connecting plate 138. The coupling devices 164 can then be tightened, drawing the bracket 156 and the second portion 142 together, securing the first body portion 126 of the cable 122 therebetween, and enabling electrical conduction.

With reference to FIGS. 3 to 6, when the bracket 156 is connected to the connecting plate 138, the first curved section 148 of the second portion 142 and the second curved section 158 of the bracket 156 together define a passage 166, such that the passage 166 at least partially receives the contact terminal 124 therein. The passage 166 defines a substantially circular shape.

Further, when the contact terminal 124 is connected to the connecting device 136, the first body portion 126 at least partially contacts each of the second portion 142 of the connecting plate 138 and the bracket 156 along the first distance S1. Furthermore, when the contact terminal 124 is connected to the connecting device 136, at least a portion of the second body portion 132 is received within the first slot 150 of the second portion 142. Moreover, when the contact terminal 124 is connected to the connecting device 136, the annular projection 134 at least partially abuts the second side 146 of the second portion 142.

Figure 7:
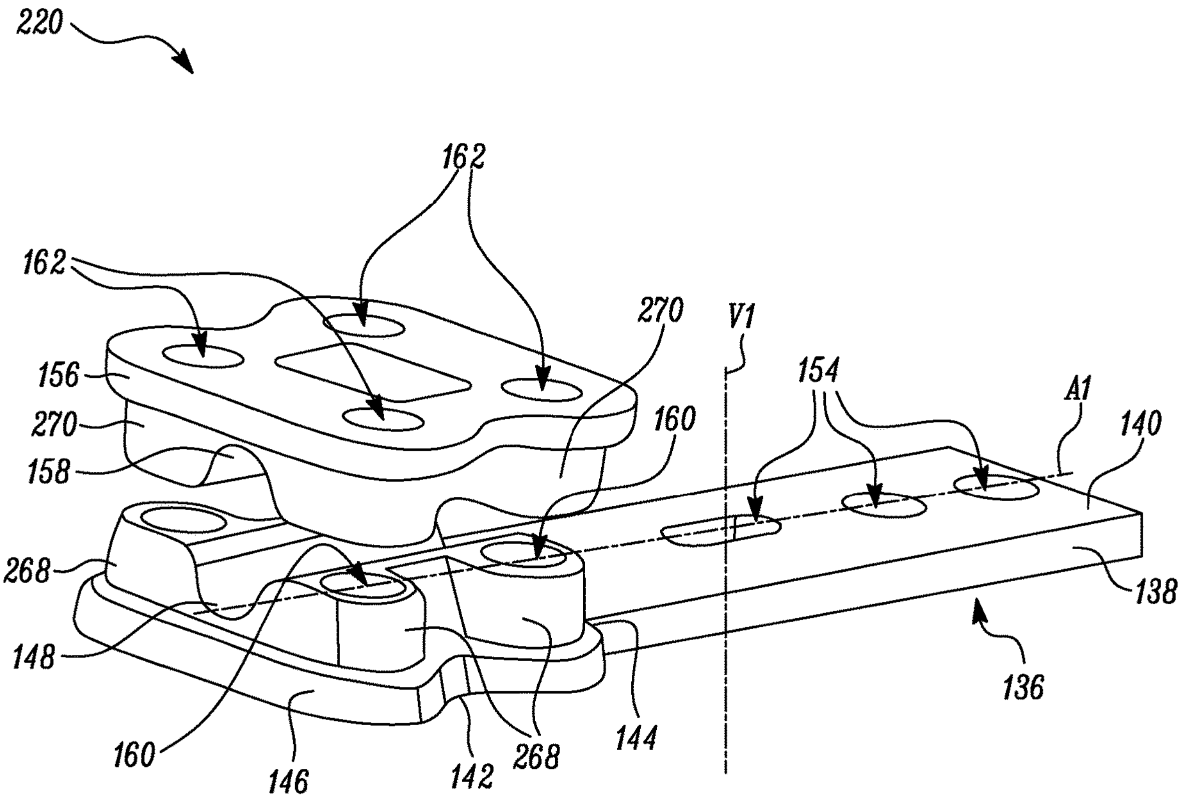
FIG. 7 is a schematic perspective view of a cable connecting assembly associated with the machine of FIG. 1, according to another embodiment of the present disclosure.

FIG. 7 illustrates a schematic perspective view of a cable connecting assembly 220 that may be associated with the machine 100 of FIG. 1, according to another embodiment of the present disclosure. The cable connecting assembly 220 is functionally similar to the cable connecting assembly 120 shown in FIGS. 3 to 6 with common components being referred to by the same reference numerals. However, the first portion 140 of the connecting plate 138 of the cable connecting assembly 220 is in alignment with and directly connected to the second portion 142 of the connecting plate 138. More particularly, the connecting device 136 of the cable connecting assembly 220 omits the intermediate portion 152 shown in FIG. 5. In this example, the first portion 140 and the second portion 142 can be integral parts of a single component.

Further, the connecting plate 138 of the cable connecting assembly 220 includes one or more first projections 268 extending along the vertical axis V1. Particularly, the second portion 142 of the connecting plate 138 includes the first projections 268. In the illustrated embodiment of FIG. 7, the second portion 142 includes four first projections 268. In other embodiments, the second portion 142 may include any number of first projections 268 based on application attributes. Each first projection 268 defines a corresponding first opening 160 for receiving the coupling device 164 (not shown in FIG. 7) therein. Thus, the connecting plate 138 includes four first openings 160 herein, each of which will receive the corresponding coupling device 164.

Moreover, the bracket 156 of the connecting device 136 of the cable connecting assembly 220 includes one or more second projections 270 extending along the vertical axis V1. In the illustrated embodiment of FIG. 7, the bracket 156 includes four second projections 270. In other embodiments, the second portion 142 may include any number of second projections 270 based on application attributes. Each second projection 270 defines a corresponding second opening 162 for receiving the corresponding coupling device 164 therein. Thus, the bracket 156 includes four second openings 16*w* herein, each of which will receive the corresponding coupling device 164. For removably coupling the bracket 156 with the second portion 142 of the connecting plate 138, each of the first projections 268 aligns with a corresponding second projection 270 on the second portion 142 in order to receive the coupling device 164 therein. The coupling devices 164 can then be tightened, drawing the bracket 156 and the second portion 142 together, securing the first body portion 126 of the cable 122 therebetween and enabling electrical conduction.

Figure 8:
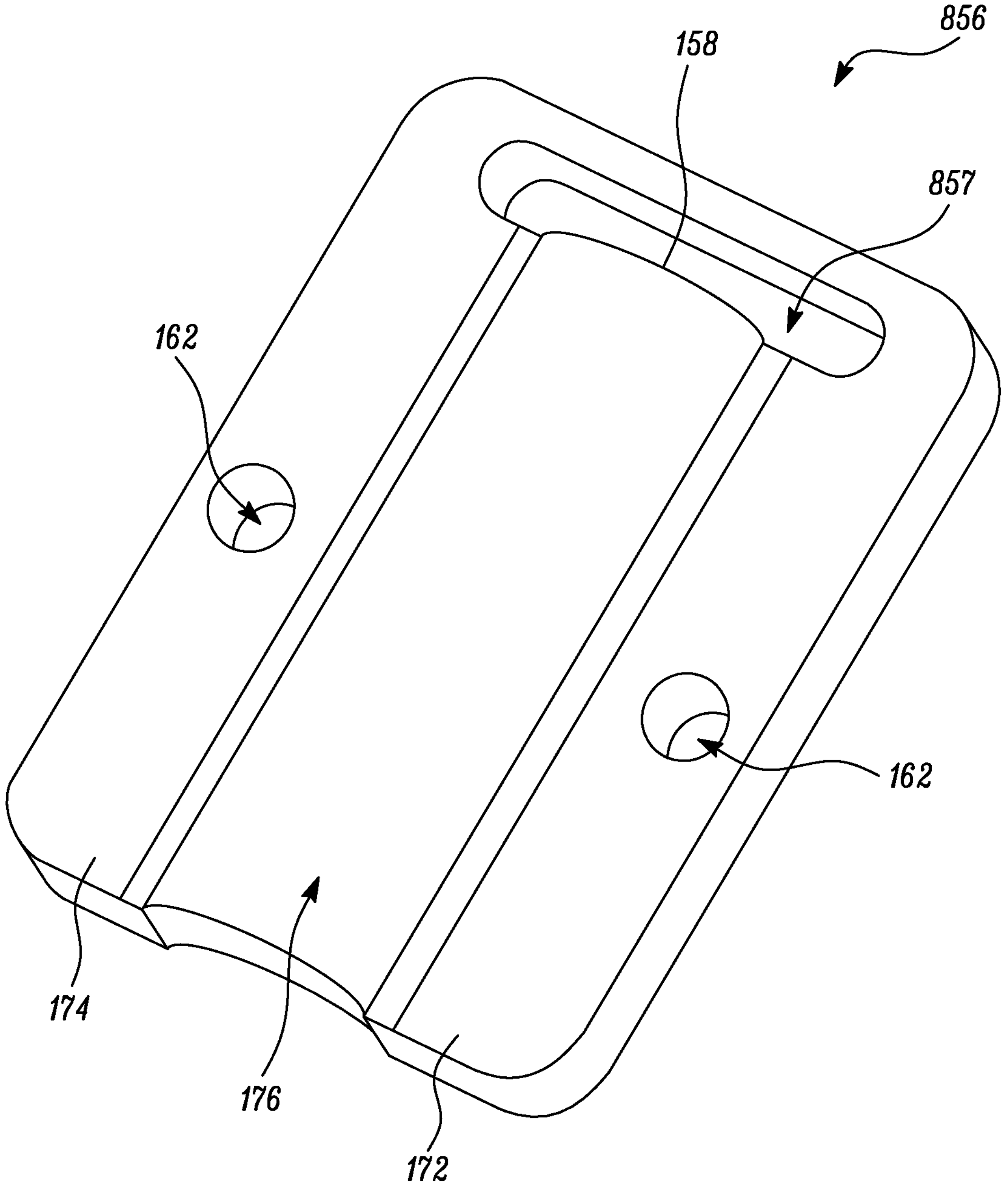
FIG. 8 is a schematic perspective view of a bracket that may be associated with the cable connecting assembly of FIGS. 3 to 6, according to another embodiment of the present disclosure.

FIG. 8 illustrates a schematic perspective view of a bracket 856 that may be associated with the cable connecting assembly 120 of FIG. 3, according to another embodiment of the present disclosure. The bracket 856 is functionally similar to the bracket 156 of the connecting device 136 shown in FIGS. 3 to 6 with common components being referred to by the same reference numerals. However, the bracket 856 defines a second slot 857 extending orthogonally to the second curved section 158. When the bracket 856 is connected to the second portion 142 (see FIG. 5) of the connecting plate 138 (see FIG. 5), the first slot 150 (see FIG. 5) and the second slot 857 are in alignment with each other.

Further, when the contact terminal 124 (see FIG. 4) is connected to the connecting device 136 (see FIG. 5), at least a portion of the second body portion 132 (see FIG. 5) is received within each of the first slot 150 of the second portion 142 and the second slot 857 of the bracket 856. Specifically, the second slot 857 partially receives a first section of the second body portion 132 and the first slot 150 partially receives a second section of the second body portion 132.

Figure 9A:
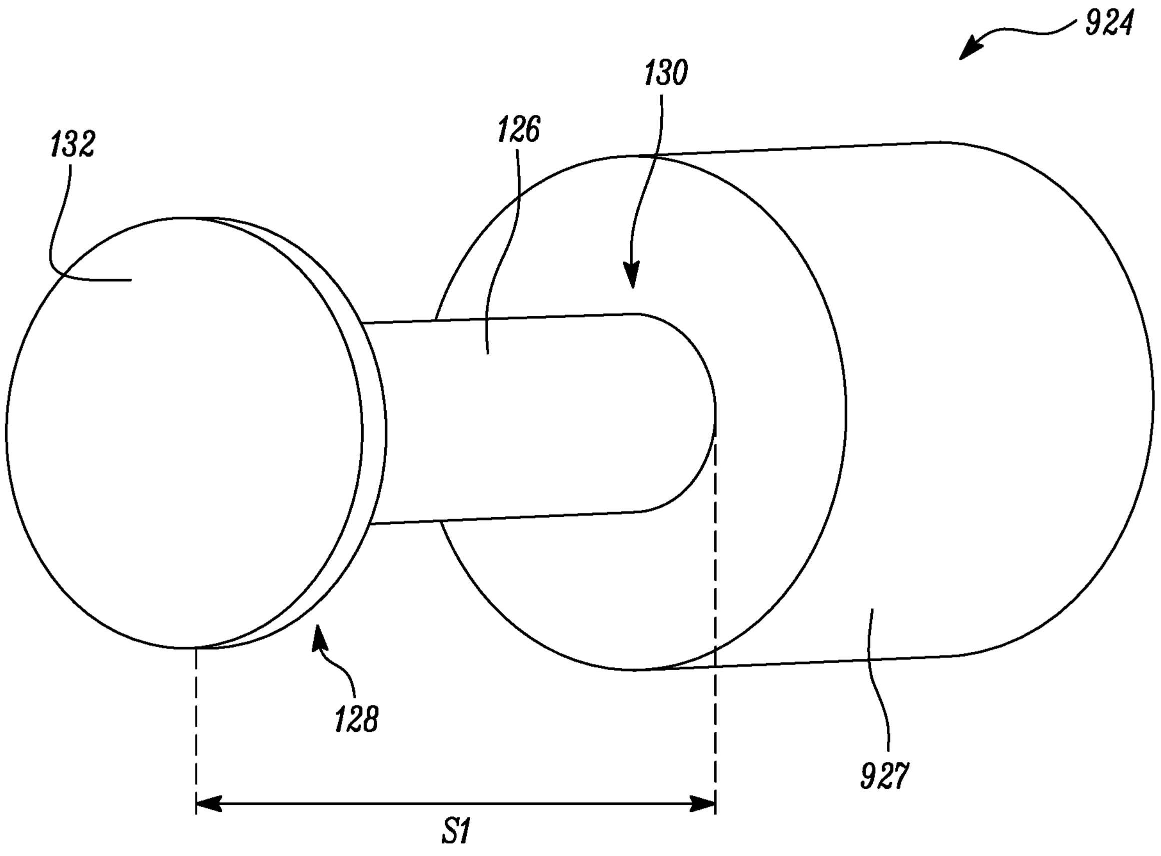
FIG. 9A is a schematic perspective view of a contact terminal that may be associated with the cable connecting assembly of FIG. 3, according to another embodiment of the present disclosure.

FIG. 9A illustrates a schematic perspective view of a contact terminal 924 that may be associated with the cable connecting assembly 120 of FIG. 3, according to another embodiment of the present disclosure. The contact terminal 924 is functionally similar to the contact terminal 124 shown in FIG. 4 with common components being referred to by the same reference numerals. The contact terminal 924 includes the first body portion 126. Further, the contact terminal 924 includes the second body portion 132. The contact terminal 924 further includes a third body portion 927 extending from the second end 130 of the first body portion 126. The third body portion 927 is axially spaced apart from the second body portion 132 by the first distance S1. The third body portion 927 defines a hollow space (not shown). The hollow space of the third body portion 927 may receive the conductive core 127 (see FIG. 9B) of the cable 122 (see FIG. 9B) therein. Further, the third body portion 927 may be crimped to secure the conductive core 127 thereto.

Figure 9B:
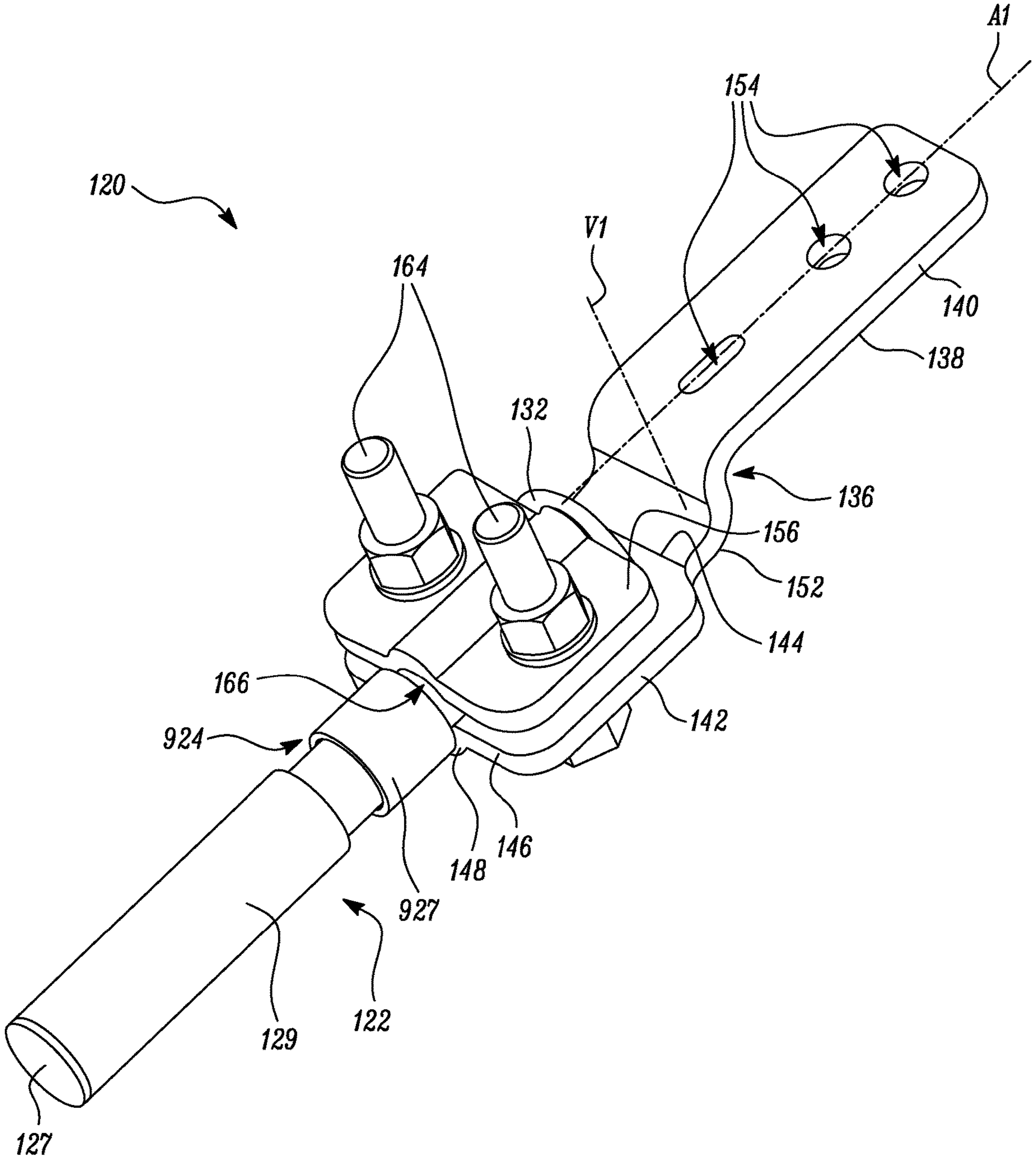
FIG. 9B is a schematic perspective of the contact terminal of FIG. 9A connected with the connecting device of FIG. 3.

Referring now to FIGS. 9A and 9B, when the contact terminal 924 is connected to the connecting device 136, the first body portion 126 at least partially contacts each of the second portion 142 of the connecting plate 138 and the bracket 156 along the first distance S1. Furthermore, when the contact terminal 924 is connected to the connecting device 136, at least a portion of the second body portion 132 is received within the first slot 150 (see FIG. 5) of the second portion 142. Moreover, when the contact terminal 924 is connected to the connecting device 136, the third body portion 927 at least partially abuts the second side 146 of the second portion 142.

Figure 10A:
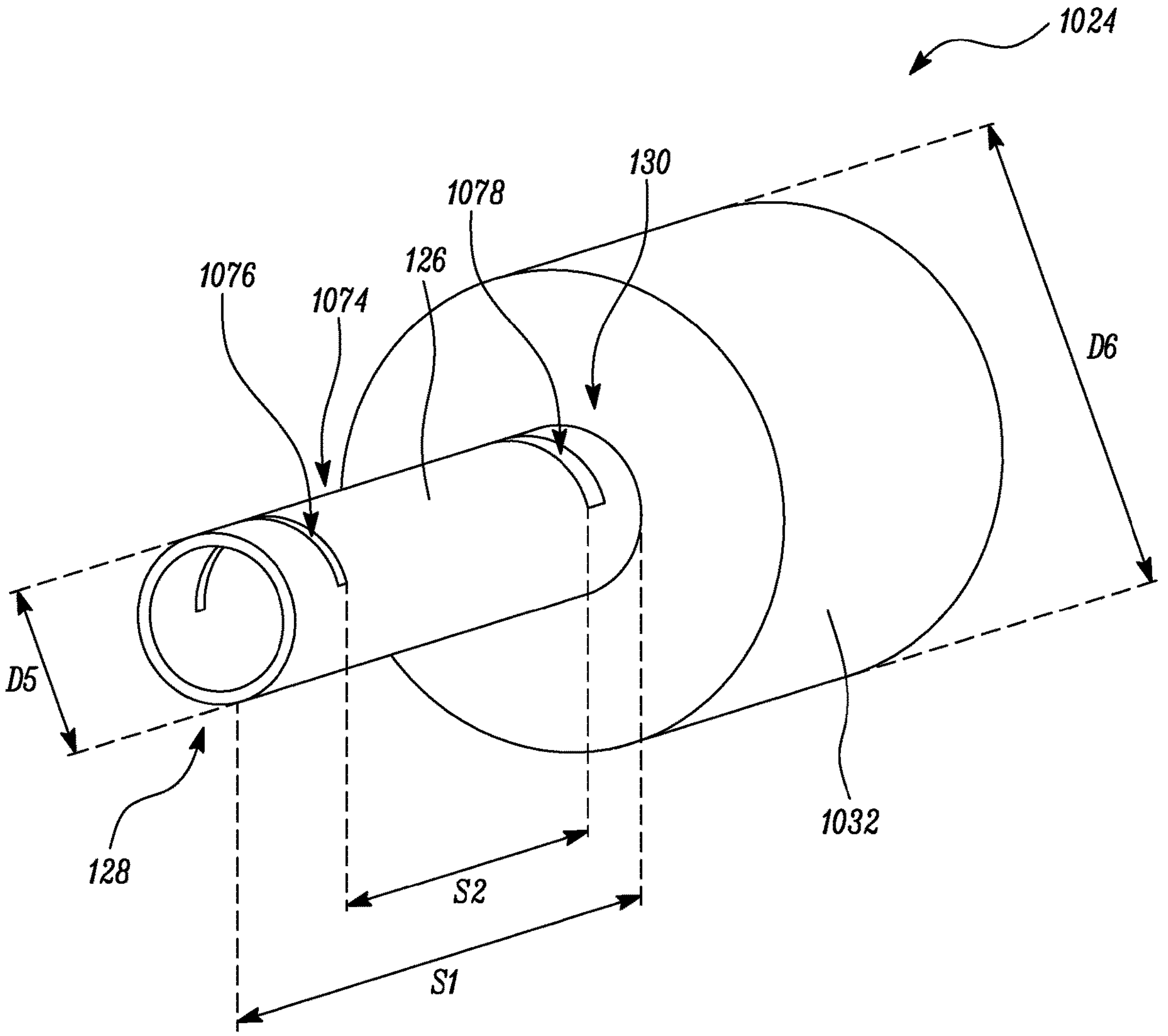
FIG. 10A is a schematic perspective view of a contact terminal that may be associated with the cable connecting assembly of FIG. 3, according to yet another embodiment of the present disclosure.

FIG. 10A illustrates a schematic perspective view of a contact terminal 1024 that may be associated with the cable connecting assembly 120 of FIG. 3, according to yet another embodiment of the present disclosure. The contact terminal 1024 is functionally similar to the contact terminal 124 shown in FIG. 4 with common components being referred to by the same reference numerals. The contact terminal 1024 is embodied as a hallow terminal herein. The contact terminal 1024 includes the first body portion 126 defining a first diameter D5. Further, the contact terminal 1024 includes a second body portion 1032 extending from the first body portion 126 and defining a second diameter D6. The second diameter D6 is greater than the first diameter D5

Further, in the illustrated embodiment of FIG. 10A, the second body portion 1032 extends from the second end 130 of the first body portion 126. The second body portion 1032 is spaced apart from the first end 128 by the first distance S1. The second body portion 1032 defines a hollow space (not shown). The hollow space of the second body portion 1032 may receive the conductive core 127 (see FIG. 3) of the cable 122 (see FIG. 3) therein. Further, the second body portion 1032 may be crimped to secure the conductive core 127 thereto.

Figure 10B:
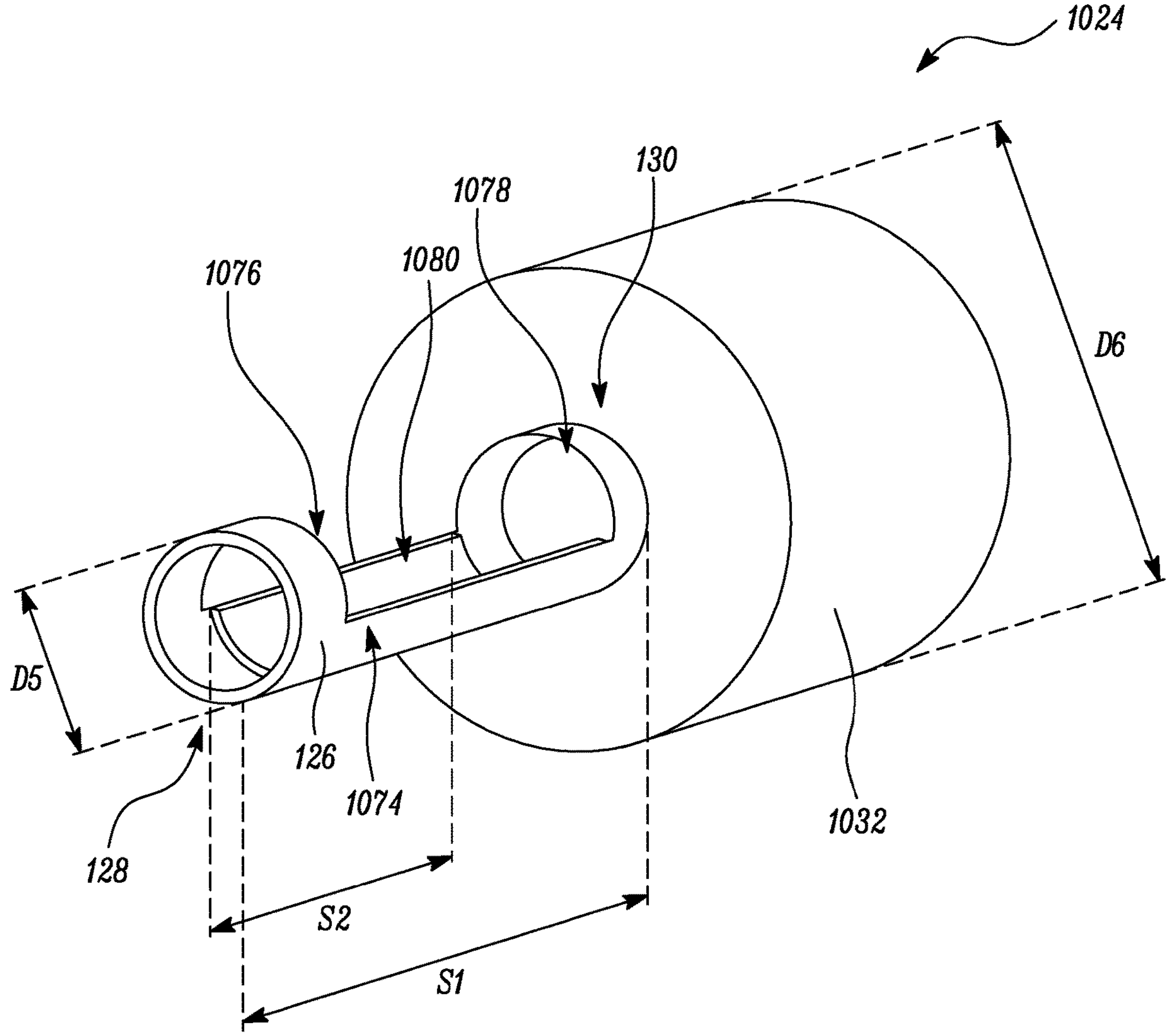
FIG. 10B is a schematic perspective view of the contact terminal of FIG. 10A.

Referring now to FIG. 10B, before assembling the contact terminal 1024 with the connecting device 136 (see FIG. 10B), a section 1074 of the first body portion 126 between cut-outs 1076, 1078 may be compressed, such that the section 1074 defines a channel 1080.

Figure 10C:
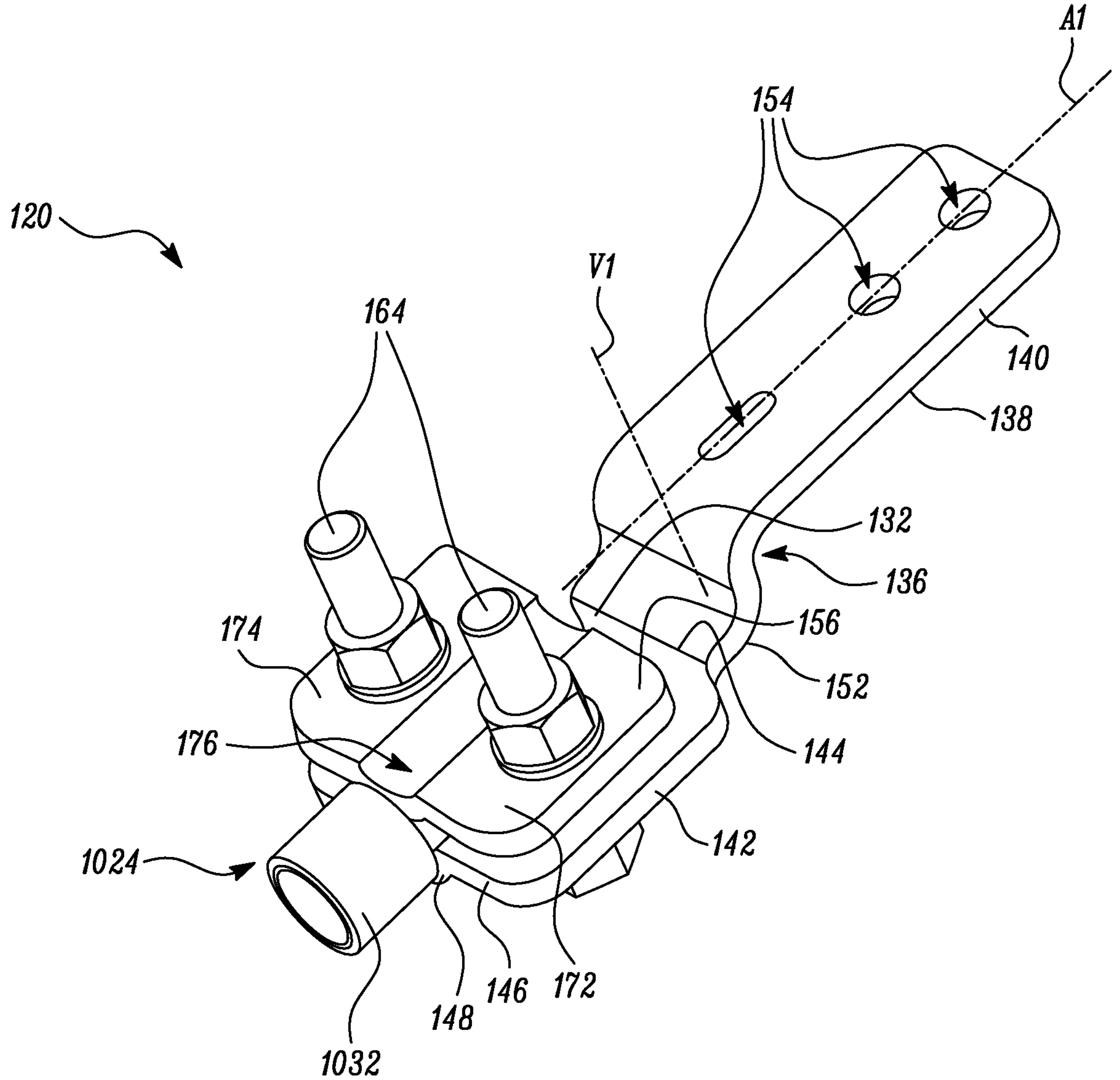
FIG. 10C is a schematic perspective of the contact terminal of FIGS. 10A and 10B connected with the connecting device of FIG. 3.

Referring now to FIGS. 10A, 10B, and 10C, when the contact terminal 1024 is connected to the connecting device 136, the section 1074 of the first body portion 126 that is compressed at least partially contacts the bracket 156 along a second distance S2. Furthermore, when the contact terminal 1024 is connected to the connecting device 136, the second body portion 1032 is spaced apart from the second side 146 of the second portion 142. Moreover, as the section 1074 is compressed, the bracket 156 of the connecting device 136 is disposed and connected to the second portion 142 such that the third and fourth planar surfaces 172, 174 face the first and second planar surfaces 168, 170 of the second portion 142, and a channel 176 defined by the second curved section 158 is disposed opposite (or faces away) to the second portion 142. Further, the channel 1080 of the section 1074 receives the second curved section 158 of the bracket 156.

As can be seen from a comparison of FIG. 9B and FIG. 10C, in the former, the bracket 156 is oriented so that the second curved section 158 projects away from the second portion 142, whereas in the latter, the bracket 156 is oriented so that the channel 176 projects toward the second portion 142. In other words, the bracket 156 is flipped upside-down.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the cable connecting assembly 120, 220 including the contact terminal 124, 924, 1024 and the connecting device 136. The surfaces of the contact terminal 124, 924, 1024 and the cable 122 of the cable connecting assembly 120, 220 that touch one another are generally circular, and so the cable 122 may be easily rotated relative to the connecting device 136 in order to dispose the cable 122 at a desired orientation without requiring specialized tools and set-ups. The contact terminal 124, 924, 1024 connects with the cable 122 (for example a high-voltage conductor cable) and may act as an orientation-free interface. The contact terminal 124, 924, 1024 may enable an operator to adjust the cable 122 in real-time. In examples wherein the bracket 856 includes the second slot 857, the second body portion 132 of the contact terminal 124, 924 can be received within each of the first slot 150 and the second slot 857 to ensure that the contact terminal 124, 924 is retained in position by the connecting device 136, and may prevent unintentional movement of the contact terminal 124, 924.

Further, the bracket 156, 856 may be disposed in different orientations. For example, the bracket 156, 856 may be disposed in a first orientation for connection of the contact terminal 124, 924. Moreover, the bracket 156, 856 may be disposed in a second orientation for connection of the contact terminal 1024.

Optionally, for the contact terminal 124, 924 the second body portion 132 can be received within the first slot 150 of the connecting device 136 to ensure that the contact terminal 124 is retained in position by the connecting device 136, and may prevent unintentional lengthwise (or axial) movement of the contact terminal 124, 924.

Moreover, in examples wherein the cable connecting assembly 200 includes the contact terminal 1024, the bracket 156 of the connecting device 136 may abut with the contact terminal 1024 at the cut-outs 1076, 1078 to prevent any unintentional lengthwise (or axial) movement of the contact terminal 1024.

Further, the cable connecting assembly 120, 220 may eliminate a requirement of specialized and heavy tools/set-ups for connecting the cable 122 with the inverter 121 that may otherwise damage the cable 122, the contact terminal 124, 924, 1024 or the connecting device 136 of the cable connecting assembly 120, 220. The cable connecting assembly 120, 220 may also simplify an assembly process of connecting the cable 122 with the inverter 121 while reducing assembly time and overall costs associated with the cable connecting assembly 120, 220. Further, the cable connecting assembly 120, 220 may be used across various machines. Moreover, the cable connecting assembly 120, 220 described herein may reduce human effort as the cable 122 of the cable connecting assembly 120, 220 may not have to be twisted and therefore, may reduce operator fatigue.

Overall, the cable connecting assembly 120, 220, when compared to conventional cable connecting assemblies, may be cost-effective, may eliminate the requirement of alignment between two or more components of the cable connecting assembly 120, 220, and may be retrofitted on existing machines.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A cable connecting assembly for a machine, the cable connecting assembly comprising:

a cable;

a contact terminal configured to connect with the cable, the contact terminal including:

a first body portion defining a first diameter, a first end, and a second end opposite the first end, wherein the first body portion extends along a first distance between the first end and the second end; and a second body portion extending from the first body portion and defining a second diameter, wherein the second diameter is greater than the first diameter of the first body portion; and a connecting device configured to connect with the contact terminal, the connecting device extending along a longitudinal axis, wherein the connecting device includes:

a connecting plate including:

a first portion; and a second portion connected to the first portion, the second portion defining a first side and a second side, such that the second portion is connected to the first portion at the first side;

a bracket configured to removably connect with the second portion of the connecting plate, such that the bracket and the second portion are together configured to removably connect the contact terminal with the connecting device; and at least one coupling device configured to removably connect the bracket with the second portion of the connecting plate, wherein, when the contact terminal is connected to the connecting device, the contact terminal at least partially abuts the second side of the second portion of the connecting plate, wherein the second portion includes a first curved section, and wherein the second portion defines a first slot extending orthogonally to the first curved section, wherein the bracket includes a second curved section, wherein, when the bracket is connected to the connecting plate, the first curved section of the second portion and the second curved section of the bracket together define a passage, such that the passage at least partially receives the contact terminal therein, and wherein, when the contact terminal is connected to the connecting device, at least a portion of the second body portion is received within the first slot of the second portion, and wherein the bracket defines a second slot extending orthogonally to the second curved section, and wherein, when the contact terminal is connected to the connecting device, at least a portion of the second body portion is received within each of the first slot of the second portion and the second slot of the bracket.

2. The cable connecting assembly of claim 1, wherein the second body portion extends from the first end of the first body portion, and wherein the contact terminal further includes an annular projection extending from the first body portion, the annular projection being axially spaced apart from the second body portion.

3. The cable connecting assembly of claim 1, wherein the second body portion extends from the first end of the first body portion, and wherein the contact terminal further includes a third body portion extending from the second end of the first body portion, the third body portion being axially spaced apart from the second body portion by the first distance.

4. The cable connecting assembly of claim 1, wherein the second body portion extends from the second end of the first body portion.

5. The cable connecting assembly of claim 1, wherein, when the contact terminal is connected to the connecting device, the first body portion is configured to at least partially contact each of the second portion of the connecting plate and the bracket along the first distance.

6. The cable connecting assembly of claim 1, wherein the first portion of the connecting plate is offset from the second portion of the connecting plate along a vertical axis that is orthogonal to the longitudinal axis, and wherein the connecting plate further includes an intermediate portion configured to connect the first portion to the second portion.

7. The cable connecting assembly of claim 1, wherein the first portion of the connecting plate is in alignment with and directly connected to the second portion of the connecting plate.

8. A connecting device for a machine, the connecting device configured to connect with a cable, the connecting device extending along a longitudinal axis, the connecting device comprising:

a connecting plate including:

a first portion; and a second portion connected to the first portion, the second portion defining a first side and a second side, such that the second portion is connected to the first portion at the first side;

a bracket configured to removably connect with the second portion of the connecting plate, such that the bracket and the second portion are together configured to removably connect the cable with the connecting device; and at least one coupling device configured to removably connect the bracket with the second portion of the connecting plate, wherein the second portion of the connecting plate has a uniform thickness along a vertical axis, wherein the second portion includes a first curved section, and wherein the second portion defines a first slot extending orthogonally to the first curved section, the first slot being configured to receive at least a portion of a contact terminal therein, wherein the bracket includes a second curved section, and wherein, when the bracket is connected to the connecting plate, the first curved section of the second portion and the second curved section of the bracket together define a passage, and wherein the bracket defines a second slot extending orthogonally to the second curved section and wherein, when the bracket is connected to the connecting plate, the first slot and the second slot are in alignment with each other, the second slot being configured to receive the at least the portion of the contact terminal therein.

9. The connecting device of claim 8, wherein the first portion of the connecting plate is offset from the second portion of the connecting plate along a vertical axis that is orthogonal to the longitudinal axis, and wherein the connecting plate further includes an intermediate portion configured to connect the first portion to the second portion.

10. The connecting device of claim 8, wherein the first portion of the connecting plate is in alignment with and directly connected to the second portion of the connecting plate.

* * * * *